Feb. 16, 1965 P. T. DEMOS 3,169,699
ANALOGUE COMPUTATION SYSTEM AND METHOD
Filed April 19, 1960 3 Sheets-Sheet 1

INVENTORS
PETER T. DEMOS
BY Rines and Rines
ATTORNEYS

Feb. 16, 1965    P. T. DEMOS    3,169,699
ANALOGUE COMPUTATION SYSTEM AND METHOD
Filed April 19, 1960    3 Sheets-Sheet 2

INVENTORS
PETER T. DEMOS
BY Rines and Rines
ATTORNEYS

Fig. 5

United States Patent Office 3,169,699
Patented Feb. 16, 1965

3,169,699
ANALOGUE COMPUTATION SYSTEM
AND METHOD
Peter T. Demos, 49 Orchard St., Belmont, Mass.
Filed Apr. 19, 1960, Ser. No. 23,318
35 Claims. (Cl. 235—61)

The present invention relates to analogue computation systems and methods and, more particularly, to mechanical analogue computers for solving problems such as the axial equations of motion of a charged particle in an accelerating electromagnetic field.

Considerable study has been given to the solution of the axial equations of motion in linear charged particle accelerators and the like. In arriving at suitable designs of accelerators or similar equipments it is necessary in general to examine, by successive trial computations, the effects of variation of the several parameters involved. In the computer herein described, the effects of variation of such parameters upon the significant variables in such problems have been made susceptible of simultaneous visualization, providing thereby a novel and powerful aid in the determination of suitable designs, particularly in providing, by such visual display, explicit indication as to a better choice of the parameters being examined.

An object of the present invention, therefore, is to provide a novel mechanical analogue computer that is suitable for the exploratory study of linear accelerator designs and the like in the charged-particle bunching region thereof. Particle phase is observed directly from a resolver, and particle momentum, particle velocity and accelerating-wave phase velocity are observed simultaneously as linear magnitudes whose relative change during calculation provides useful intuitive guidance in the choice of accelerator parameters.

A further object is to provide a new computer and computation method.

Other and further objects will be explained hereinafter and will be more particularly pointed out in connection with the appended claims.

The invention will now be described in connection with the accompanying drawing, FIG. 1 of which is a block diagram of a computer constructed in accordance with a preferred embodiment of the invention.

Considering, for illustrative purposes, though the invention is by no means limited thereto, the problem of solving the axial equations of electron motion in linear accelerators and the like, a charged particle of mass $m$, subjected to a sinusoidal accelerating electric-wave field which travels and points in the $z$-direction, moves according to the equations of motion (1) $\quad \dfrac{dp}{dt} = Ee \sin \omega \left( t - \int \dfrac{dz}{v_\phi} \right) = Ee \sin \theta$ and (2) $\quad \dfrac{d\theta}{dt} = -\omega \left( \dfrac{v - v_\phi}{v_\phi} \right)$ where $e$ is the particle charge, $p$ is the momentum of the particle, $t$ is time, $\omega$ is the angular frequency of the field, $\theta$ is the particle phase, and where the phase velocity $v_\phi$ and amplitude E of the accelerating wave are, in general, both functions of co-ordinate $z$.

Figure 1:
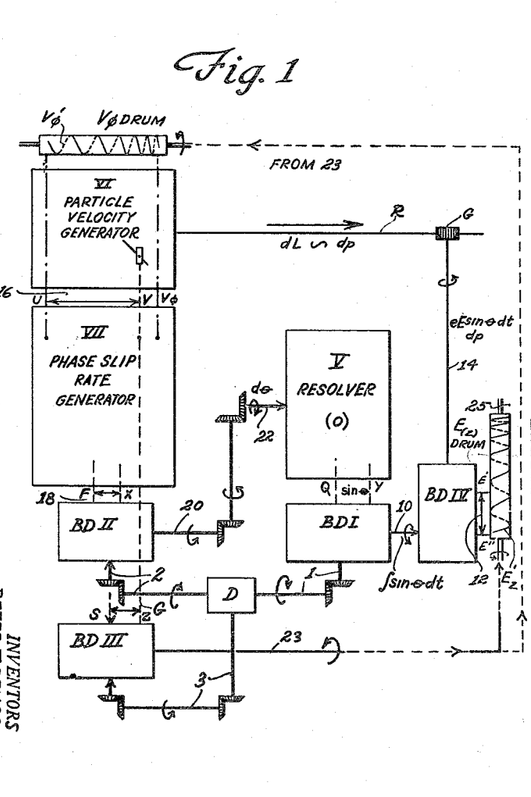

The general features and operation will first be explained, before delving into the details of the preferred mechanical construction, in connection with the block and detail diagrams of FIGS. 1 and 2, which are top views of the apparatus, roughly to scale, although elongated somewhat in the top-to-bottom direction for convenience of representation.

Figure 2:
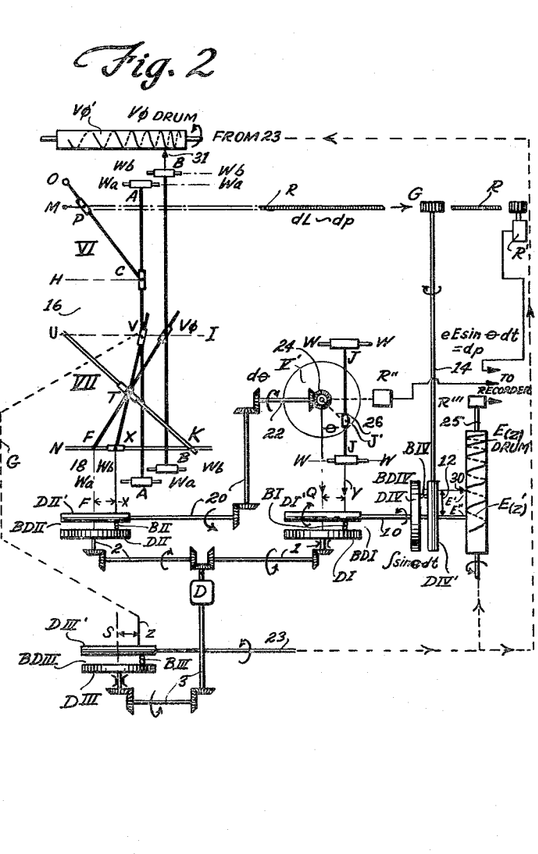
FIG. 2 is a top elevation of apparatus suitable for the system of FIG. 1.

Three integrator devices, preferably, though not essentially, of the ball-disc type (such as the 2½ inch or 5 inch DBR Integrators marketed by the Ford Instrument Company, Division of Sperry Rand Corporation) are shown at BDI, BDII and BDIII, driven by respective shafts 1, 2 and 3 from a common motor drive D so that their respective discs DI, DII, DIII, FIG. 2, are rotated in synchronism with a constant or other predetermined rate, corresponding, in this particular problem, to the passage of time. Each ball disc integrator has a rotatable disc, such as DI for the integrator BDI, a cylinder, such as the cylinder DI' having its axis parallel to the plane of the disc DI, and intermediate ball or balls BI for communicating rotary motion of the disc DI to the cylinder DI', the ball or balls being radially variably positioned to provide, by the rotation of the cylinder, an integration resulting from the rotation of the disc DI for the particular position of the ball or balls. The particle phase angle $\theta$ is set in a resolver V' to provide one-to-one correspondence with the instantaneous phase position of the particle under acceleration. The output of the resolver V', indicated at QY, is proportional to $\sin \theta$ and is impressed upon the integrator BDI, the rotation of the output shaft 10 of which, in time $dt$, is accordingly proportional to $\sin \theta dt$. To attain this result the link arm extension Y, displaces the balls BI of the disc integrator BDI the distance QY (proportional to $\sin \theta$) from the center of the disc. The output 10 is thus labelled $\int \sin \theta dt$, and is evidenced by a rotation of the shaft 10 which rotates the disc DIV of a further integrator BDIV, serving as a rotational speed changer having an output 12 proportional to the magnitude of the indicated length E'E''. As later described, E'E'' is made proportional to the instantaneous electric field strength E(z) of the accelerating field. The output shaft 14 of the cylinder DIV' of the integrator BDIV, thus, in rotation, is proportional to E $\sin \theta dt$; or, as is evident from Equation 1, above, to the corresponding change of momentum $dp$ of the accelerated particle. The rotation of the shaft 14, proportional to $dp$, is transferred through a gear G to a rack R so as to effect a corresponding movement thereof, $dL$. This effects the length of a later-described linkage OP, FIG. 2, of a particle velocity generator VI. The linkage of generator VI, illustrated in FIG. 2 as the lengths OPC and ACA, is arranged to transform the momentum change $dp$ relativistically into the corresponding change of velocity $dv$. The output 16 of the particle velocity generator linkage VI is manifested by a mechanical change in the length indicated by the distances HC or UV, the over-all magnitude of which is proportional to the particle velocity $v$.

This displacement UV and a corresponding mechanical displacement $UV_\phi$ are now impressed simultaneously upon a further linkage VTX, $V_\phi$TF, of a phase slip rate generator VII. If $UV_\phi$, to the same scale as UV, is made to equal the accelerating wave phase velocity $v_\phi$ at the location $z$ of the accelerated particle, then the constraints of the linkage VII are such, as later explained, that an output 18 of mechanical length FX results, that is exactly proportional to the rate of change of the particle phase $d\theta/dt$.

This length FX is impressed upon the integrator BDII in a manner similar to that discussed in connection with the integrator BDI; that is, the arm X displaces the balls BII from the center of the disc DII a distance corresponding to $d\theta/dt$. The output shaft 20 of the cylinder DII' of the integrator BDII then rotates in time $dt$ by an angle proportional to $d\theta$. The change $d\theta$, finally, is applied by shaft 22 to the resolver V', thereby adjusting $\theta$ therein, as later explained, to its proper instantaneous value.

Knowledge of the instantaneous position $z$ of the accelerated particle is obtained by the straightforward integration of $vdt$, by means of the integrator BDIII. The arm Z is coupled to point V of the phase slip rate generator VII through a gear reducer, schematically illustrated at G, so as to produce a length SZ proportional to the length UV and, hence, to the particle velocity, $dz/dt$. The arm Z thus displaces the balls BIII from the disc center of the integrator BDIII a distance corresponding to the particle velocity. The output shaft 23 of the cylinder DIII' thus produces, in rotation, a movement proportional to the change in particle position, $dz$, and is used to produce the angular rotation of the two drums, labelled $E(z)$ and $V_\phi$, the total angular rotations of which are therefore each measures of particle position $z$ along the accelerator axis. The accelerating wave phase velocity and amplitude to be used during a given calculation, as functions of $z$, may thus be plotted as helical traces $E(z)'$ and $V_\phi'$ along these respective drums.

Momentum and phase, versus co-ordinate, of the particle may be recorded during calculation by using helipots R', R" and R"', driven, respectively, by rack R, the resolver shaft 24 and the shaft 25 of the $E(z)$ drum, to vary the voltage inputs of a conventional X-Y recorder or the like. The time required for calculating and plotting a typical run ranges from one to several minutes, depending upon the conditions of the problem.

It is now in order to proceed to a more detailed description of the various computer elements, above described, and their interconnection and operation.

The roles and the operation of the ball disc integrators are evident from what has already been discussed. Because these and other components are so well-known in the computer field, it is not considered necessary to clutter the drawings with minute details, schematic representations being fully explanatory of the workings of the invention to those skilled in the art. Further details, however, are available in my article entitled "Mechanical Analogue Computer for Solving the Axial Equations of Motion in Linear Accelerators," appearing in the Review of Scientific Instruments (Vol. 30, No. 7, 543–547, July 1959) and are incorporated herein by reference.

The resolver V' has its shaft 24 rotated as the angle $\theta$ changes, by the shaft 22, as before explained. A link arm or rod JJ, laterally movable by sleeves J along parallel guides W—W, is positioned along the guides W—W by the intermediate sleeve J' which is fixed to the resolver disc V', whereby an angle $\theta$ is developed between the vertical in FIG. 2 and the line 26. The horizontal separation QY, before-mentioned, is thus proportional to $\sin \theta$.

The functions of the computer elements designated as "Particle Velocity Generator" VI and "Phase Slip Rate Generator" VII are respectively those of the relativistic conversion of momentum to velocity, and of combining the instantaneous particle and wave velocities, $v$ and $v_\phi$, so as to generate a physical length proportional to the time rate of change of particle phase position.

Considering, first, the particle velocity generator VI, this consists of rack R, which moves left to right in FIG. 2; a rod or arm OC pivoted at point O and attached to the rack R through a sliding bearing at an intermediate variable position P; and a rod or arm AA, connected to the free end of the rod OC by means of a second sliding bearing C, which is free to move longitudinally along the rod AA. The rod AA, in turn, is connected at each end to bearings A which move freely along parallel guides $W_a$—$W_a$.

Figure 3:
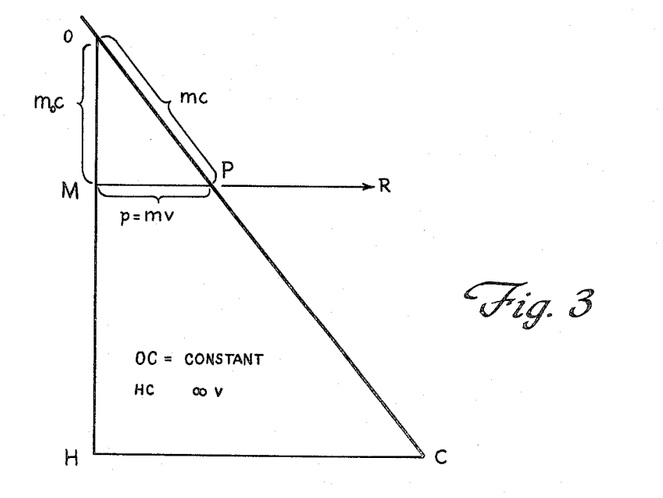
FIG. 3 is a geometrical configuration of the particle generator linkage of FIGS. 1 and 2.

Referring to FIG. 3, since the motion of the rack R, as before stated, is proportional to the change in particle momentum $dp$, if the horizontal length MP between the point M, aligned but below the pivot point O and the intermediate variable-position sliding bearing P is set initially to be proportional to $p_0$, the initial momentum of the particle to be followed, then the length MP, in the course of the computation, will be proportional to the instantaneous particle momentum $p=mv$. If the length OM, to this scale, is made equal to $m_0c$ (that is the product of the initial mass $m_0$ of the particle and the velocity of light $c$), then the side OP of the triangle OMP is $$(m^2v^2+m^2_0c^2)^{1/2}=mc$$

The ratios MP/OP and HC/OC of triangles OMP and OHC are thus $HC/OC=MP/OP=v/c$. Since the length of the rod OC forming the hypotenuse of the right triangle OHC is kept constant, then the "output" length along the triangle base HC is proportional to the instantaneous particle velocity $v$. The velocity scale here, obviously, is $c=OC$.

As before stated the length along the base represented by HC (distance between the origin vertical line OH and the rod or arm AA) serves as an output of the particle velocity generator VI to set a corresponding length UV in the input of the phase slip rate generator VII. The phase slip rate generator VII comprises two fixed rods or link arms UK and NK intersecting at K, which, together with a movable rod or arm $V_\phi F$, form a pair of triangles $UV_\phi T$ and TFK having a common vertex T; a further movable rod or arm VX; and a rod or arm BB, identical to the rod AA and capable of moving along guides $W_b$—$W_b$, parallel to but in a different plane from the guides $W_a$—$W_a$. Points V and $V_\phi$ are fixed to the rods AA and BB, respectively, so as to move along the base line UI as the rods AA and BB slide along the respective guides $W_a$—$W_a$ and $W_b$—$W_b$. The attachments at V and $V_\phi$ are bearings which allow rods VX and $V_\phi F$, by proper rotation and slippage, to follow freely any lateral motion of the rods AA and BB along the respective guides $W_a$—$W_a$ and $W_b$—$W_b$. Rod $V_\phi F$ is pivoted at F and rod VX slides freely at the sleeve X along rod NK. The three rods UK, VX and $V_\phi F$ are made to intersect at the sleeve coupling T, but once again with sufficient rotational and sliding freedom so as to permit rods AA and BB to move independently along the guides $W_a$—$W_a$ and $W_b$—$W_b$.

Figure 4:
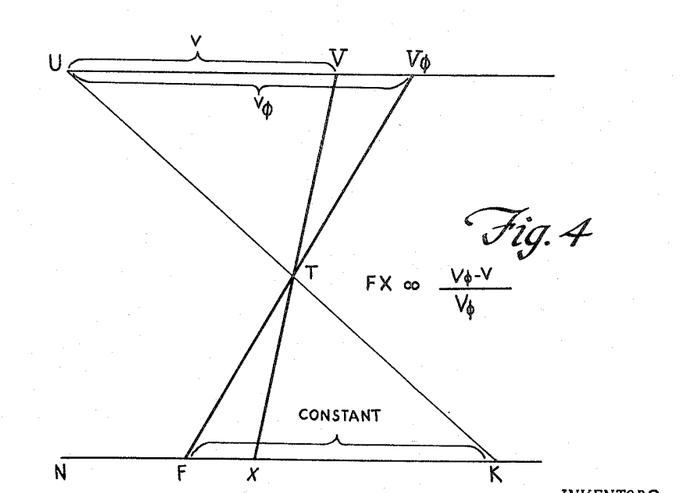
FIG. 4 is a similar geometrical configuration of the phase slip rate generator linkage of FIGS. 1 and 2.

With these provisions, the members of this system will always be disposed in a geometrical arrangement like that of FIG. 4, regardless of the magnitudes of the distances UV and $UV_\phi$. It can be readily seen, accordingly, that length FX, between the pivot point F and the sleeve X, intermediate the base FK, because of the constancy of the fixed base distance FK, is, by geometry, proportional to the ratio $VV_\phi/UV_\phi$. Since UV is proportional to $v$ and $UV_\phi$ is proportional to $v_\phi$, then FX is proportional also to $(v_\phi-v)/v_\phi$; or, since $\omega$ is constant, to $d\theta/dt$, Equation 2, above. It is this distance FX that, as before explained, is set at the disc DII of the ball disc integrator BDII to inject therein the quantity $d\theta/dt$.

Calibration of the computer is accomplished for both the electric field intensity E and the particle co-ordinate $z$. First, the angle $\theta$ of the resolver V' is set at some fixed value (usually $\pi/2$). The displacement of the pointer 30, connected to move the balls BIV of the integrator BDIV, in order to provide the length E'E", is fixed at the setting for which the calibration is to be made. The total change of the length MP, indicated by L, is now measured, corresponding to a unit change in angle of the drive shaft of motor D. If the length of OM (which corresponds to $m_0c$) FIG. 3, is designated as $L_0$, then from this measurement and Equation 1, above, it can be seen that (3) $\quad \Delta P = E_{cal} e \left( \sin \dfrac{\pi}{2} \right) \Delta t = E_{cal} e \Delta t = \dfrac{L}{L_0} m_0 c$ where $\Delta t$ is the time interval corresponding to unit change in angle of the drive shaft of motor D and $E_{cal}$ is the calibrated value of the electric field intensity E. The second calibration step consists of disengaging the rack R from drive gear G and setting lengths UV and $UV_\phi$ to correspond to a fixed value $r$ of the ratio $(v_\phi - v)/v_\phi$. If one now measures the number of revolutions $n$ of the resolver disc V' which occur during unit change of angle of the shaft of the drive motor D, it will be seen from Equation 2, above, that (4) $\quad |\Delta \theta| = \omega \left( \dfrac{v_\phi - v}{v_\phi} \right) \Delta t = \omega r \Delta t = n 2\pi$ Combining the expressions for $\Delta P$ and $|\Delta \theta|$ of Equations 3 and 4, one obtains the calibration parameter $\alpha_{cal}$:

(5) $\quad \alpha_{cal} = \left[ \dfrac{E_{cal} e \lambda_0}{m_0 c^2} \right] = \left( \dfrac{r}{L_0} \right) \dfrac{L}{n}$ As for the $z$ displacement of the particle along the accelerator axis, this, as before explained, is expressed in the computer by the rotations of the $v_\phi(z)$ and $E(z)$ drums. Calibration here is accomplished by disengaging R from G, as before, and setting UV to correspond to a fixed particle velocity $v_{cal}$. If, under these conditions, $n'$ rotations of these drums occur for unit change in angle of the shaft of the motor D, then it follows that change of particle co-ordinate $z$, per revolution, of either drum, is given by:

(6) $\quad \Delta \xi = \dfrac{\Delta z}{\lambda_0} = \left( \dfrac{v_{cal}}{cr} \right) \dfrac{n}{n'}$ where $\lambda_0$ is the free-space wavelength of the accelerating field and $r$ and $n$ are calibration constants from Equation 5, above.

A prototype apparatus, capable of carrying the calculations to particle energies of $\sim 2m_0 c^2$, has been used for test calculations and has demonstrated sufficient accuracy to allow the exploration of specific choices of $\omega$, $v_\phi(z)$ and $E(z)$ in practical bunching problems of interest. Since particle momentum is displayed as a linear magnitude, the device is restricted in respect to the upper limit of particle energy which can be examined. Reasonable apparatus size, if unusual mechanical designs are to be avoided, would probably set this limit at from $4m_0 c^2$ to $6m_0 c^2$. Satisfactory calculations beyond this point, however, for most cases of practical interest, can be carried through by comparatively simple approximation methods.

Figure 5:
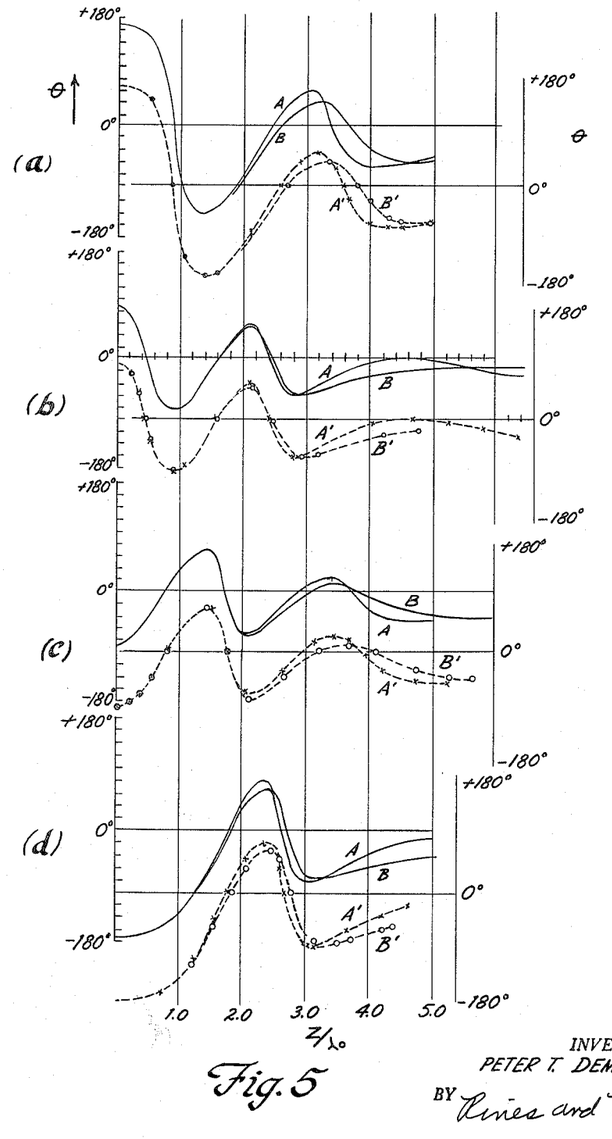
FIG. 5 is a graph comparing the computer-obtained results of the present invention with theoretically calculated results for an electron-bunching problem.

An illustration of the accuracy and versatility of the computer of FIG. 2, constructed as described in my said article, is set forth in FIG. 5. The problems there plotted are those reported by J. M. Ponce de Leon, Stanford University Technical Report ML-265, June 1955, dealing with high-percentage electron capture and good phase bunching linear accelerator sections. Two calculated examples are plotted as the solid lines A and B of FIGS. 5(a) through (d). The ordinate (indicated to the left for calculated results and to the right for the present-invention computer-obtained results) plots the angle $\theta$, and the abscissa plots the ratio $z/\lambda_0$. The dotted lines A', B' and plotted points are data from the computer of the present invention. The close correspondence between the time-consuming theoretical curves A, B and the curves A', B' obtained rapidly by the computer of the present invention is evident. In these cases, both phase velocity and electric field change substantially over the bunching interval. For both A and B, field strength varies with $\xi = z/\lambda_0$ according to the condition:

(7) $\quad \alpha(\xi) = \dfrac{E(\xi) c \lambda_0}{m_0 c^2} = 1.485 + 1.215 \sin \dfrac{\pi}{2} \left( \dfrac{\xi - 4}{4} \right)$ i.e. by a factor of ten over the interval $z=0$ to $z=8\lambda_0$. The phase velocity varies so as to move the phase stable point, in the same interval, from 0 to $-45°$ in case A and from 0 to $-60°$ in case B, according to the conditions:

(8) Case A $\quad \theta_s = -\dfrac{\pi}{8} \left[ 1 + \sin \dfrac{\pi}{2} \left( \dfrac{\xi - 4}{4} \right) \right]$ (9) Case B $\quad \theta_s = -\dfrac{\pi}{6} \left[ 1 + \sin \dfrac{\pi}{2} \left( \dfrac{\xi - 4}{4} \right) \right]$ The functions $v_\phi(\xi)$ and $\alpha(\xi)$ for these conditions were calculated and used to prepare the before-mentioned drum charts.

Repeatability of the analogue computer data with the system of FIG. 2, over very many runs, was to better than $\pm 3°$, in spite of the fact that the drum traces were followed by hand-operating the pointers 30, 31 during calculation.

The computer may be readily modified for the treatment of related problems. Calculations of the axial electron trajectories of particles in a cavity operating in the $TM_{010}$ mode, for example, can be treated by recognizing that the equations of motion are identical with (1) and (2), above, provided $v_\phi = \infty$. Mechanically this corresponds to eliminating the phase slip rate generator and its attendant elements, and with the integrator BDII simply set, in this case, to have its output equal to the constant rate of phase slip $d\theta/dt = -\omega$.

Further modifications will occur to those skilled in the art and all such are considered to fall within the spirit and scope of the invention as defined in the appended claims.

What is claimed is:

1. A mechanical analogue computer for solving problems including the illustrative equations of motion of a charged particle subjected to an alternating electric field that travels along a predetermined direction $z$, having, in combination, movable means provided with calibration means representing quantities including the particle amplitude E as function of the said direction $z$; resolver means adapted to be set at an angle $\theta$ corresponding to quantities including the instantaneous phase position of the particle under acceleration and provided with means for producing an output corresponding to $\sin \theta$; first integrator means connected to receive the output of the resolver means to produce an output representative of the integral of quantities including $\sin \theta dt$, where $dt$ is the differential of time; second integrator means connected to the output of the first integrator means, means following the calibration means upon the movable means connected to the second integrator means for producing an output representative of the integral of quantities including $E(z) \sin \theta dt$, which corresponds to the change in particle momentum $dp$; and first means connected to the output of the second integrator means for producing a mechanical length corresponding to quantities including the particle velocity $v$.

2. A mechanical analogue computer for solving problems including the illustrative equations of motion of a charged particle subjected to an alternating electric field that travels along a predetermined direction $z$, having, in combination, movable means provided with calibration means representing quantities including the particle accelerating-wave phase velocity $v_\phi$ and amplitude E, respectively, as functions of the said direction $z$; resolver means adapted to be set at an angle $\theta$ corresponding to quantities including the instantaneous phase position of the particle under acceleration and provided with means for producing an output corresponding to $\sin \theta$; first integrator means connected to receive the output of the resolver means to produce an output representative of the integral of quantities including $\sin \theta dt$, where $dt$ is the differential of time; second integrator means connected to the output of the first integrator means, means following the calibration means upon the movable means connected to the second integrator means for producing an output representative of the integral of quantities including $E(z) \sin \theta dt$, which corresponds to the change in particle momentum $dp$; first means connected to the output of the second integrator means for producing a mechanical length corresponding to quantities including particle velocity $v$; second length-producing means, and means following the calibration means of the said movable means controlling the second length-producing means for producing a further mechanical length corresponding to quantities including the particle acceleration phase velocity $v_\phi$, the second length-producing means being provided with means for subtracting the said mechanical lengths and means for producing a resultant mechanical length corresponding to quantities including the ratio $(v_\phi-v)/v_\phi$, and hence to the rate of change of phase position of the particle under acceleration, in the case of the charged particle motion.

3. A mechanical analogue computer for solving problems including the illustrative equations of motion of a charged particle subjected to an alternating electric field that travels along a predetermined direction $z$, having, in combination, movable means provided with calibration means representing quantities including the particle accelerating-wave phase velocity $v_\phi$ and amplitude E, respectively, as functions of the said direction $z$; resolver means adapted to be set at an angle $\theta$ corresponding to quantities including the instantaneous phase position of the particle under acceleration and provided with means for producing an output corresponding to $\sin \theta$; first integrator means connected to receive the output of the resolver means to produce an output representative of the integral of quantities including $\sin \theta dt$, where $dt$ is the differential of time; second integrator means connected to the output of the first integrator means, means following the calibration means upon the movable means connected to the second integrator means for producing an output representative of the integral of quantities including $E(z) \sin \theta dt$, which corresponds to the change in particle momentum $dp$; and first means connected to the output of the second integrator means for producing a mechanical length corresponding to quantities including particle velocity $v$; second length-producing means, means following the calibration means of the said movable means controlling the second length-producing means for producing a further mechanical length corresponding to quantities including the particle acceleration phase velocity $v_\phi$, the second length-producing means being provided with means for subtracting the said mechanical lengths and means for producing a resultant mechanical length corresponding to quantities including the ratio $(v_\phi-v)/v_\phi$, and hence to the rate of change of phase position of the particle under acceleration, in the case of the charged particle motion; third integrator means controlled by the resultant mechanical length for producing an output corresponding to quantities including $d\theta$; means for connecting the output of the third integrator means to the resolver means continually to set the same at the instantaneous value of quantities including $\theta$; fourth integrator means connected with the first means and responsive to the said mechanical length therein corresponding to quantities including the particle velocity $v$ for producing an output representative of quantities including the position $z$ of the particle; moving means, and means connecting the output of the fourth integrator means to the moving means for moving the movable means.

4. A mechanical analogue computer for solving problems including the illustrative equations of motion of a charged particle subjected to an alternating electric field that travels along a predetermined direction $z$, having, in combination, movable means provided with calibration means representing quantities including the particle amplitude E as a function of the said direction $z$; resolver means adapted to be set at an angle $\theta$ corresponding to quantities including the instantaneous phase position of the particle under acceleration and provided with means for producing an output corresponding to $\sin \theta$; first integrator means connected to receive the output of the resolver means to produce an output representative of the integral of quantities including $\sin \theta dt$, where $dt$ is the differential of time; second integrator means connected to the output of the first integrator means, means following the calibration means upon the movable means connected to the second integrator means for producing an output representative of the integral of quantities including $E(z) \sin \theta dt$, which corresponds to the change in particle momentum $dp$; first means connected to the output of the second integrator means for producing a mechanical length corresponding to quantities including the particle velocity $v$; third integrator means for producing an output corresponding to quantities including phase-slip rate; means for connecting the output of the third integrator means to the resolver means continually to set the same at the instantaneous value of quantities including $\theta$; fourth integrator means connected with the first means and responsive to the said mechanical length therein corresponding to quantities including the particle velocity $v$ for producing an output representative of quantities including the position $z$ of the particle; moving means, and means connecting the output of the fourth integrator means to the moving means for moving the movable means.

5. A mechanical analogue computer for solving problems including the illustrative equations of motion of a charged particle subjected to an alternating electric field that travels along a predetermined direction $z$, having, in combination, rotatable drum means provided with calibration curves representing quantities including the particle amplitude E as function of the said direction $z$; resolver means adapted to be set at an angle $\theta$ corresponding to quantities including the instantaneous phase position of the particle under acceleration and provided with means for producing an output corresponding to $\sin \theta$; first integrator means connected to receive the output of the resolver means to produce an output representative of the integral of quantities including $\sin \theta dt$, where $dt$ is the differential of time; second integrator means connected to the output of the first integrator means, means following the calibration curves upon the second rotatable drum connected to the second integrator means for producing an output representative of the integral of quantities including $E(z) \sin \theta dt$, which corresponds to the change in particle momentum $dp$; and first linkage means connected to the output of the second integrator means for producing a mechanical length corresponding to quantities including the particle velocity $v$.

6. A mechanical analogue computer for solving problems including the illustrative equations of motion of a charged particle subjected to an alternating electric field that travels along a predetermined direction $z$, having, in combination, first and second rotatable drums provided with calibration curves representing quantities including the particle accelerating-wave phase velocity $v_\phi$ and amplitude E, respectively, as functions of the said direction $z$; resolver means adapted to be set at an angle $\theta$ corresponding to quantities including the instantaneous phase position of the particle under acceleration and provided with means for producing an output corresponding to $\sin \theta$; first integrator means connected to receive the output of the resolver means to produce an output representative of the integral of quantities including $\sin \theta dt$, where $dt$ is the differential of time; second integrator means connected to the output of the first integrator means, means following the calibration curves upon the second rotatable drum connected to the second integrator means for producing an output representative of the integral of quantities including $E(z) \sin \theta dt$, which corresponds to the change in particle momentum $dp$; and first linkage means connected to the output of the second integrator means for producing a mechanical length corresponding to quantities including the particle velocity $v$; and second linkage means, means following the calibration curves of the first rotatable drum controlling the second linkage means for producing a further mechanical length corresponding to quantities including the particle acceleration phase velocity $v_\phi$, the second linkage means being provided with means for subtracting the said mechanical lengths and means for producing a resultant mechanical length corresponding to quantities including the ratio $(v_\phi-v)/v_\phi$, and hence to the rate of change of phase position of the particle under acceleration in the case of the charged particle motion.

7. A mechanical analogue computer for solving problems including the illustrative equations of motion of a charged particle subjected to an alternating electric field that travels along a predetermined direction $z$, having, in combination, first and second rotatable drums provided with calibration curves representing quantities including the particle accelerating-wavephase velocity $v_\phi$ and amplitude E, respectively, as functions of the said direction $z$; resolver means adapted to be set at an angle $\theta$ corresponding to quantities including the instantaneous phase position of the particle under acceleration and provided with means for producing an output corresponding to sin $\theta$; first integrator means connected to receive the output of the resolver means to produce an output representative of the integral of quantities including sin $\theta dt$, where $dt$ is the differential of time; second integrator means connected to the output of the first integrator means, means following the calibration curves upon the second rotatable drum connected to the second integrator means for producing an output representative of the integral of quantities including $E(z)$ sin $\theta dt$, which corresponds to the change in particle momentum $dp$; and first linkage means connected to the output of the second integrator means for producing a mechanical length corresponding to quantities including the particle velocity $v$; and second linkage means, means following the calibration curves of the first rotatable drum controlling the second linkage means for producing a further mechanical length corresponding to quantities including the particle acceleration phase velocity $v_\phi$, the second linkage means being provided with means for subtracting the said mechanical lengths and means for producing a resultant mechanical length corresponding to quantities including the ratio $(v_\phi-v)/v_\phi$, and hence to the rate of change of phase position of the particle under acceleration in the case of the charged particle motion; and third integrator means controlled by the resultant mechanical length for producing an output corresponding to quantities including $d\theta$; means for connecting the output of the third integrator means to the resolver means continually to set the same at the instantaneous value of quantities including $\theta$; fourth integrator means connected with the first linkage means and responsive to the said mechanical length therein corresponding to quantities including the particle velocity $v$ for producing an output representative of quantities including the position $z$ of the particle; rotating means, and means connecting the output of the fourth integrator means to the rotating means for rotating the first and second drums.

8. A mechanical analogue computer as claimed in claim 1 and in which the said first means connected to the output of the second integrator means comprises a link arm of fixed length constituting the hypotenuse of a right triangle and having an intermediate point of variable position along the arm, and means responsive to the change momentum of the particle for varying the said position thereby to produce, along the base of the said right triangle, a length proportional to the particle velocity $v$.

9. A mechanical analogue computer as claimed in claim 2 and in which the said second means for producing a further mechanical length comprises a pair of intersecting link arms forming a pair of triangles having a common vertex at the point of intersection and oppositely disposed bases to which the arms may be movably connected, the length of one base being adjustably to a length corresponding to $v_\phi$ and the length of the other base being constant, and a further link arm connected and extending at one end from an intermediate position along the said one base corresponding to $v$ through the said point of intersection to an intermediate position along the said other base corresponding to $(v_\phi-v)/v_\phi$ or $d\theta/dt$.

10. A mechanical analogue computer for solving the equations of motion of a charged particle subjected to an alternating electric field that travels along a predetermined direction $z$, having, in combination, first and second rotatable drums provided with calibration curves representing the particle accelerating-wave phase velocity $v_\phi$ and amplitude E, respectively, as functions of the said direction $z$; resolver means adapted to be set at an angle $\theta$ corresponding to the instantaneous phase position of the particle under acceleration and provided with means for producing an output corresponding to sin $\theta$; first integrator means connected to receive the output of the resolver means to produce an output representative of the integral of sin $\theta dt$, where $dt$ is the differential of time; second integrator means connected to the output of the first integrator means, means following the calibration curves upon the second rotatable drum connected to the second integrator means for producing an output representative of the integral of $E(z)$ sin $\theta dt$, which corresponds to the change in particle momentum $dp$; first linkage means connected to the output of the second integrator means for producing a mechanical length corresponding to the particle velocity $v$; and second linkage means, means following the calibration curves, of the first rotatable drum controlling the second linkage means for producing a further mechanical length coresponding to the particle acceleration phase velocity $v_\phi$, the second linkage means being provided with means for subtracting the said mechanical lengths and producing a resultant mechanical length corresponding to the ratio $(v_\phi-v)/v_\phi$, and hence to the rate of change of phase position of the particle under acceleration.

11. A mechanical analogue computer for solving the equations of motion of a charged particle subjected to an alternating electric field that travels along a predetermined direction $z$, having, in combination, first and second rotatable drums provided with calibration curves representing the particle accelerating-wave phase velocity $v_\phi$ and amplitude E, respectively, as functions of the said direction $z$; resolver means adapted to be set at an angle $\theta$ corresponding to the instantaneous phase position of the particle under acceleration and provided with means for producing an output corresponding to sin $\theta$; first integrator means connected to receive the output of the resolver means to produce an output representative of the integral of sin $\theta dt$, where $dt$ is the differential of time; second integrator means connected to the output of the first integrator means, means following the calibration curves upon the second rotatable drum connected to the second integrator means for producing an output respresenting of the integral of $E(z)$ sin $\theta dt$, which corresponds to the change in particle momentum $dp$; first linkage means connected to the output of the second integrator means for producing a mechanical length corresponding to the particle velocity $v$; second linkage means, means following the calibration curves of the first rotatable drum controlling the second linkage means for producing a further mechanical length corresponding to the particle acceleration phase velocity $v_\phi$, the second linkage means being provided with means for subtracting the said mechanical lengths and means for producing a resultant mechanical length corresponding to the ratio $(v_\phi-v)/v_\phi$, and hence to the rate of change of phase position of the particle under acceleration, third integrator means controlled by the resultant mechanical length for producing an output corresponding to $d\theta$; means for connecting the output of the third integrator means to the resolver means continually to set the same at the instantaneous value of $\theta$; fourth integrator means connected with the first linkage means and responsive to the said mechanical length therein corresponding to the particle velocity $v$ for producing an output representative of the position $z$ of the particle; rotating means, and means connecting the output of the fourth integrator means to the rotating means for rotating the first and second drums.

12. A mechanical analogue computer for solving the equations of motion of a charged particle subject to an alternating electric field that travels along a predetermined direction $z$, having, in combination, first and second rotatable drums provided with calibration curves representing the particle accelerating-wave phase velocity $v_\phi$ and amplitude E, respectively, as functions of the said direction $z$; resolver means adapted to be set at an angle $\theta$ corresponding to the instantaneous phase position of the particle under acceleration and provided with means for producing an output corresponding to $\sin \theta$; first integrator means connected to receive the output of the resolver means to produce an output representative of the integral of $\sin\ dt$, where $dt$ is the differential of time; second integral means connected to the output of the first integrator means, means following the calibration curves upon the second rotatable drum connected to the second integrator means for producing an output representative of the integral of $E(z) \sin \theta dt$, which corresponds to the change in particle momentum $dp$; first linkage means connected to the output of the second integrator means for producing a mechanical length corresponding to the particle velocity $v$; second linkage means, means following the calibration curves of the first rotatable drum controlling the second linkage means for producing a further mechanical length corresponding to the particle acceleration phase velocity $v_\phi$, the second linkage means being provided with means for subtracting the said mechanical lengths and means for producing a resultant mechanical length corresponding to the ratio $(v_\phi-v)/v_\phi$, and hence to the rate of change of phase position of the particle under acceleration, third integrator means controlled by the resultant mechanical length for producing an output corresponding to $d\theta$; means for connecting the output of the third integrator means to the resolver means continually to set the same at the instantaneous value of $\theta$; fourth integrator means connected with the first linkage means and responsive to the said mechanical length therein corresponding to the particle velocity $v$ for producing an output representative of the position $z$ of the particle; rotating means, means connecting the output of the fourth integrator means to the rotating means for rotating the first and second drums; and transducer means connected with the resolver means and the second integrator means transforming mechanical position thereof into electrical signals for indicating the particle momentum and phase.

13. A mechanical analogue computer for solving the equations of motion of a charged particle subjected to an alternating electric field that travels along a predetermined direction $z$, having, in combination, first and second rotatable drums provided with calibration curves representing the particle accelerating-wave phase velocity $v_\phi$ and amplitude E, respectively, as functions of the said direction $z$; resolver means adapted to be set at an angle $\theta$ corresponding to the instantaneous phase position of the particle under acceleration and provided with means for producing an output corresponding to $\sin \theta$; first ball-disc integrator means connected to receive the output of the resolver means to produce an output representative of the integral of $\sin \theta dt$, where $dt$ is the differential of time; second ball-disc integrator means connected to the output of the first integrator means, means following the calibration curves upon the second rotatable drum connected to the second ball-disc integrator means for producing an output representative of the integral of $E(z) \sin \theta dt$, which corresponds to the change in particle momentum $dp$; first linkage means connected to the output of the second integrator means for producing a mechanical length corresponding to the particle velocity $v$; scond linkage means, means following the calibration curves of the first rotatable drum controlling the second linkage means for producing a further mechanical length corresponding to the particle acceleration phase velocity $v_\phi$, the second linkage means being provided with means for subtracting the said mechanical lengths and means for producing a resultant mechanical length corresponding to the ratio $(v_\phi-v)/v_\phi$, and hence to the rate of change of phase position of the particle under acceleration.

14. A mechanical analogue computer for solving the equations of motion of a charged particle subjected to an alternating electric field that travels along a predetermined direction $z$, having, in combination, first and second rotatable drums provided with calibration curves representing the particle accelerating-wave phase velocity $v_\phi$ and amplitude E, respectively, as functions of the said direction $z$; resolver means adapted to be set at an angle $\theta$ corresponding to the instantaneous phase position of the particle under acceleration and provided with means for producing an output corresponding to $\sin \theta$; first ball-disc integrator means connected to receive the output of the resolver means to produce an output representative of the integral of $\sin \theta dt$, where $dt$ is the differential of time; second ball-disc integrator means connected to the output of the first integrator means, means following the calibration curves upon the second rotatable drum connected to the second ball-disc integrator means for producing an output representative of the integral of $E(z) \sin \theta dt$, which corresponds to the change in particle momentum $dp$; first linkage means connected to the output of the second integrator means for producing a mechanical length corresponding to the particle velocity $v$; second linkage means, means following the calibration curves of the first rotatable drum controlling the second linkage means for producing a further mechanical length corresponding to the particle acceleration phase velocity $v_\phi$, the second linkage means being provided with means for subtracting the said mechanical lengths and means for producing a resultant mechanical length corresponding to the ratio $(v_\phi-v)/v_\phi$, and hence to the rate of change of phrase position of the particle under acceleration, third ball-disc integrator means controlled by the resultant mechanical length for producing an output corresponding to $d\theta$; means for connecting the output of the third integrator means to the resolver means continually to set the same at the instantaneous value of $\theta$; fourth ball-disc integrator means connected with the first linkage means and responsive to the said mechanical length therein corresponding to the particle velocity $v$ for producing an output representative of the position $z$ of the particle; rotating means, and means connecting the output of the fourth integrator means to the rotating means for rotating the first and second drums.

15. A mechanical analogue computer for solving the equations of motion of a charged particle subjected to an alternating electric field that travels along a predetermined direction $z$, having, in combination, first and second rotatable drums provided with calibration curves representing the particle accelerating-wave phase velocity $v_\phi$ and amplitude E, respectively, as functions of the said direction $z$; resolver means adapted to be set at an angle $\theta$ corresponding to the instantaneous phase position of the particle under acceleration and provided with means for producing an output corresponding to $\sin \theta$; first ball-disc integrator means connected to receive the output of the resolver means to produce an output representative of the integral of $\sin \theta dt$, where $dt$ is the differential of time; second ball-disc integrator means connected to the output of the first integrator means, means following the calibration curves upon the recond rotatable drum connected to the second ball-disc integrator means for producing an output representative of the integral of $E(z) \sin \theta dt$, which corresponds to the change in particle momentum $dp$; first linkage means connected to the output of the second integrator means for producing a mechanical length corresponding to the particle velocity $v$; second linkage means, means following the calibration curves of the first rotatable drum controlling the second linkage means for producing a further mechanical length corresponding to the particle acceleration phase velocity $v_\phi$, the second linkage means being provided with means for subtracting the said mechanical lengths and means for producing a resultant mechanical length corresponding to ratio $$(v_\phi - v)/v_\phi$$

and hence to the rate of change of phase position of the particle under acceleration; third ball-disc integrator means controlled by the resultant mechanical length for producing an output corresponding to $d\theta$; means for connecting the output of the third integrator means to the resolver means continually to set the same at the instantaneous value of $\theta$; fourth ball-disc integrator means connected with the first linkage means and responsive to the said mechanical length therein corresponding to the particle velocity $v$ for producing an output representative of the position $z$ of the particle; rotating means, means connecting the output of the fourth integrator means to the rotating means for rotating the first and second drums; and transducer means connected with the resolver means, the second integrator means output and the drum-rotating means for transforming mechanical position thereof into electrical signals for indicating the particle momentum and phase.

16. A mechanical analogue computer as claimed in claim 10 and in which the said first linkage means comprises particle velocity generator means comprising a link arm of fixed length constituting the hypotenuse of a right triangle and having an intermediate point of variable position along the arm, and means responsive to the change in momentum of the particle for varying the said position thereby to produce, along the base of the said right triangle, a length proportional to the particle velocity $v$.

17. A mechanical analogue computer as claimed in claim 10 and in which the said second linkage means comprises phase slip rate generator means comprising a pair of intersecting link arms forming a pair of triangles having a common vertex at the point of intersection and oppositely disposed parallel bases, the length of one base being adjustable to a length corresponding to $v_\phi$ and the length of the other base being constant, and a further link arm extending at one end from an intermediate position along the said one base corresponding to $v$ through the said point of intersection to an intermediate position along the said other base corresponding to $(v_\phi - v)/v_\phi$.

18. A mechanical analogue computer as claimed in claim 17 and in which the said first linkage means comprises a link arm of fixed length constituting the hypotenuse of a right triangle and having an intermediate point of variable position along the arm, and means responsive to the change in momentum of the particle for varying the said position thereby to produce, along the base of the said right triangle, a length proportional to the particle velocity $v$.

19. A mechanical analogue computer for solving the equations of motion of a charged particle subjected to an alternating electric field that travels along a predetermined direction $z$, having, in combination, first and second rotatable drums provided with calibration curves representing the particle accelerating-wave phase velocity $v_\phi$ and amplitude E, respectively, as functions of the said direction $z$; resolver means adapted to be set at an angle $\theta$ corresponding to the instantaneous phase position of the particle under acceleration and provided with means for producing an output corresponding to $\sin \theta$; first integrator means connected to receive the output of the resolver means to produce an output representative of the integral of $\sin \theta dt$, where $dt$ is the differential of time; second integrator means connected to the output of the first integrator means, means following the calibration curves upon the second rotatable drum connected to the second integrator means for producing an output representative of the integral of $E(z) \sin \theta dt$, which corresponds to the change in particle momentum $dp$; first linkage means connected to the output of the second integrator means for producing a mechanical length corresponding to the particle velocity $v$; second linkage means, means following the calibration curves of the first rotatable drum controlling the second linkage means for producing a further mechanical length corresponding to the particle acceleration phase velocity $v_\phi$, the second linkage means being provided with means for subtracting the said mechanical lengths and means for producing a resultant mechanical length corresponding to the ratio $(v_\phi - v)/v_\phi$, and hence to the rate of change of phase position of the particle under acceleration; third integrator means controlled by the resultant mechanical length for producing an output corresponding to $d\theta$; means for connecting the output of the third integrator means to the resolver means continually to set the same at the instantaneous value of $\theta$; fourth integrator means connected with the first linkage means and responsive to the said mechanical length therein corresponding to the particle velocity $v$ for producing an output representative of the position $z$ of the particle; rotating means, means connecting the output of the fourth integrator means to the rotating means for rotating the first and second drums, the said first linkage means comprising a link arm of fixed length constituting the hypotenuse of a right triangle and having an intermediate point of variable position along the arm; and means responsive to the change in momentum of the particle for varying the said position thereby to produce, along the base of the said right triangle, a length proportional to the particle velocity $v$.

20. A mechanical analogue computer as claimed in claim 19 and in which the said means for varying the position of the intermediate point along the link arm comprises a rack driven by gear means rotated by the output of the second integrator means.

21. A mechanical analogue computer as claimed in claim 19 and in which the said resolver means comprises a rotatable member and a link arm having an intermediate point secured to the rotatable member and the position of which is varied in accordance with the output of the third integrator means to produce an analogue angle corresponding to the angle $\theta$.

22. A mechanical analogue computer for solving the equations of motion of a charged particle subjected to an alternating electric field that travels along a predetermined direction $z$, having, in combination, first and second rotatable drums provided with calibration curves representing the particle accelerating-wave phase velocity $v_\phi$ and amplitude E, respectively, as functions of the said direction $z$; resolver means adapted to be set at an angle $\theta$ corresponding to the instantaneous phase position of the particle under acceleration and provided with means for producing an output corresponding to $\sin \theta$; first integrator means connected to receive the output of the resolver means to produce an output representative of the integral of $\sin \theta dt$, where $dt$ is the differential of time; second integrator means connected to the output of the first integrator means, means following the calibration curves upon the second rotatable drum connected to the second integrator means for producing an output representative of the integral of $E(z) \sin \theta dt$, which corresponds to the change in particle momentum $dp$; first linkage means connected to the output of the second integrator means for producing a mechanical length corresponding to the particle velocity $v$; second linkage means, means following the calibration curves of the first rotatable drum controlling the second linkage means for producing a further mechanical length corresponding to the particle acceleration phase velocity $v_\phi$, the second linkage means being provided with means for subtracting the said mechanical lengths and means for producing a resultant mechanical length corresponding to the ratio $(v_\phi - v)/v_\phi$, and hence to the rate of change of phase position of the particle under acceleration, third integrator means controlled by the resultant mechanical length for producing an output corresponding to $d\theta$; means for connecting the output of the third integrator means to the resolver means continually to set the same at the instantaneous value of $\theta$; fourth integrator means connected with the first linkage means and responsive to the said mechanical length therein corresponding to the particle velocity $v$ for producing an output representative of the position $z$ of the particle; rotating means, and means connecting the output of the fourth integrator means to the rotating means for rotating the first and second drums, the said second linkage means comprising a pair of intersecting link arms forming a pair of triangles having a common vertex at the point of intersection and oppositely disposed parallel bases, the length of one base being adjustable to a length corresponding to $v_\phi$ and the length of the other base being constant, and a further link arm extending at one end from an intermediate position along the said one base corresponding to $v$ through the said point of intersection to an intermediate position along the said other base corresponding to $(v_\phi - v)/v_\phi$ or $d\theta/dt$.

23. A mechanical analogue computer as claimed in claim 22 and in which the said adjustability of the length of the said one base to correspond to $v_\phi$ is effected by arm means controlled by means adapted to follow the said $v_\phi$ calibration curve upon the first drum.

24. A mechanical analogue computer as claimed in claim 22 and in which the said first linkage means comprises a link arm of fixed length constituting the hypotenuse of a right triangle and having an intermediate point of variable position along the arm, and means responsive to the change in momentum of the particle for varying the said position thereby to produce, along the base of the said right triangle, a length proportional to the particle velocity $v$.

25. A mechanical analogue computer as claimed in claim 24 and in which the said means for varying the position of the intermediate point along the said first linkage-means link arm comprises a rack driven by gear means rotated by the output of the second integrator means.

26. A mechanical analogue computer as claimed in claim 25 and in which the said adjustability of the length of the said one base to correspond to $v_\phi$ is effected by first arm means controlled by means adapted to follow the said $v_\phi$ calibration curve upon the first drum.

27. A mechanical analogue computer as claimed in claim 26 and in which the said first linkage-means hypotenuse arm is connected to move with further arm means disposed substantially parallel to the first arm means.

28. A mechanical analogue computer as claimed in claim 27 and in which the said one end of the second linkage-means further link arm is connected to move with the said further arm means.

29. A mechanical analogue computer for solving the equations of motion of a charged particle subjected to an alternating electric field that travels along a predetermined direction $z$, having, in combination, rotatable drum means provided with calibration curves representing the particle amplitude E as a function of the said direction $z$; resolver means adapted to be set at an angle $\theta$ corresponding to the instantaneous phase position of the particle under acceleration and provided with means for producing an output corresponding to sin $\theta$; first integrator means connected to receive the output of the resolver means to produce an output representative of the integral of sin $\theta dt$, where $dt$ is the differential of time; second integrator means connected to the output of the first integrator means, means following the calibration curves upon the rotatable drum means connected to the second integrator means for producing an output representative of the integral of $E(z)$ sin $\theta dt$, which corresponds to the change in particle momentum $dp$; and first linkage means connected to the output of the second integrator means for producing a mechanical length corresponding to the particle velocity $v$.

30. A mechanical analogue computer for solving the equations of motion of a charged particle subjected to an alternating electric field that travels along a predetermined direction $z$, having, in combination, rotatable drum means provided with calibration curves representing the particle amplitude E as a function of the said direction $z$; resolver means adapted to be set at an angle $\theta$ corresponding to the instantaneous phase position of the particle under acceleration and provided with means for producing an output corresponding to sin $\theta$; first integrator means connected to receive the output of the resolver means to produce an output representative of the integral of sin $\theta dt$, where $dt$ is the differential of time; second integrator means connected to the output of the first integrator means, means following the calibration curves upon the rotatable drum means connected to the second integrator means for producing an output representative of the integral of $E(z)$ sin $\theta dt$, which corresponds to the change in particle momentum $dp$; first linkage means connected to the output of the second integrator means for producing a mechanical length corresponding to the particle velocity $v$; third integrator means for producing an output corresponding to a substantially constant rate of phase slip; means for connecting the output of the third integrator means to the resolver means continually to set the same at the instantaneous value of $\theta$; fourth integrator means connected with the first linkage means and responsive to the said mechanical length therein corresponding to the particle velocity $v$ for producing an output representative of the position $z$ of the particle; rotating means, and means connecting the output of the fourth integrator means to the rotating means for rotating the drum means.

31. A mechanical analogue computer as claimed in claim 30 and in which the said constant rate of phase slip is substantially equal to $-\omega$, where $\omega$ is the angular frequency of the said alternating electric field.

32. Apparatus for analogue computation for solving problems including the illustrative equations of motion of a charged particle subjected to an alternating electric field that travels along a predetermined direction $z$, that comprises, means for producing a physical representation of an angle $\theta$, corresponding to quantities including the instantaneous phase position of the particle under acceleration; means for producing a length corresponding to sin $\theta$; means for integrating the quantity sin $\theta$ with respect to quantities including time $t$; means for producing a length corresponding to quantities including the amplitude $E(z)$ of the said alternating electric field; and means for combining the integrated quantity with the last-named length to produce a rotation and/or translation corresponding to quantities including the integral of $E(z)$ sin $\theta dt$, which corresponds to the change in particle momentum $dp$.

33. Apparatus for analogue computation as set forth in claim 32 and in which there are provided means for producing a mechanical reproduction of a right triangle having an hypotenuse of fixed length, means for moving a point along the hypotenuse in response to the said rotation $dp$, and means for indicating a length along the base of the triangle proportional to quantities including the particle velocity $v$.

34. Apparatus for analogue computation as set forth in claim 33 and in which there are provided means for producing a length corresponding to quantities including the particle accelerating-wave phase velocity $v_\phi$, means for producing a mechanical reproduction of a pair of triangles having a common vertex at the point of intersection and oppositely disposed parallel bases, means for adjusting the length of one base to the value $v_\phi$ and the length of the other base to a constant value, and means for sub-dividing the pair of triangles by a line extending at one end from an intermediate position along the said one base corresponding to the said length indicated as $v$ through the said point of intersection to an intermediate position along the said other base corresponding to the quantity $(v_\phi - v)/v_\phi$.

35. Apparatus for analogue computation as set forth in claim 34 and in which there are provided means for integrating the said length corresponding to $v$ in order to produce a further rotation corresponding to quantities including an incremental change of $z$, and means for controlling the production of the said lengths corresponding to quantities including $E(z)$ and $v_\phi$ during the said further rotation.

References Cited in the file of this patent
UNITED STATES PATENTS

| | | |
|---|---|---|
| 1,900,757 | Corlett | Mar. 7, 1933 |
| 2,590,875 | Lancor | Apr. 1, 1952 |

OTHER REFERENCES

Svoboda: Computing Mechanisms and Linkages 1948, page 12, McGraw-Hill Book Co., New York and London.